Figure 1:
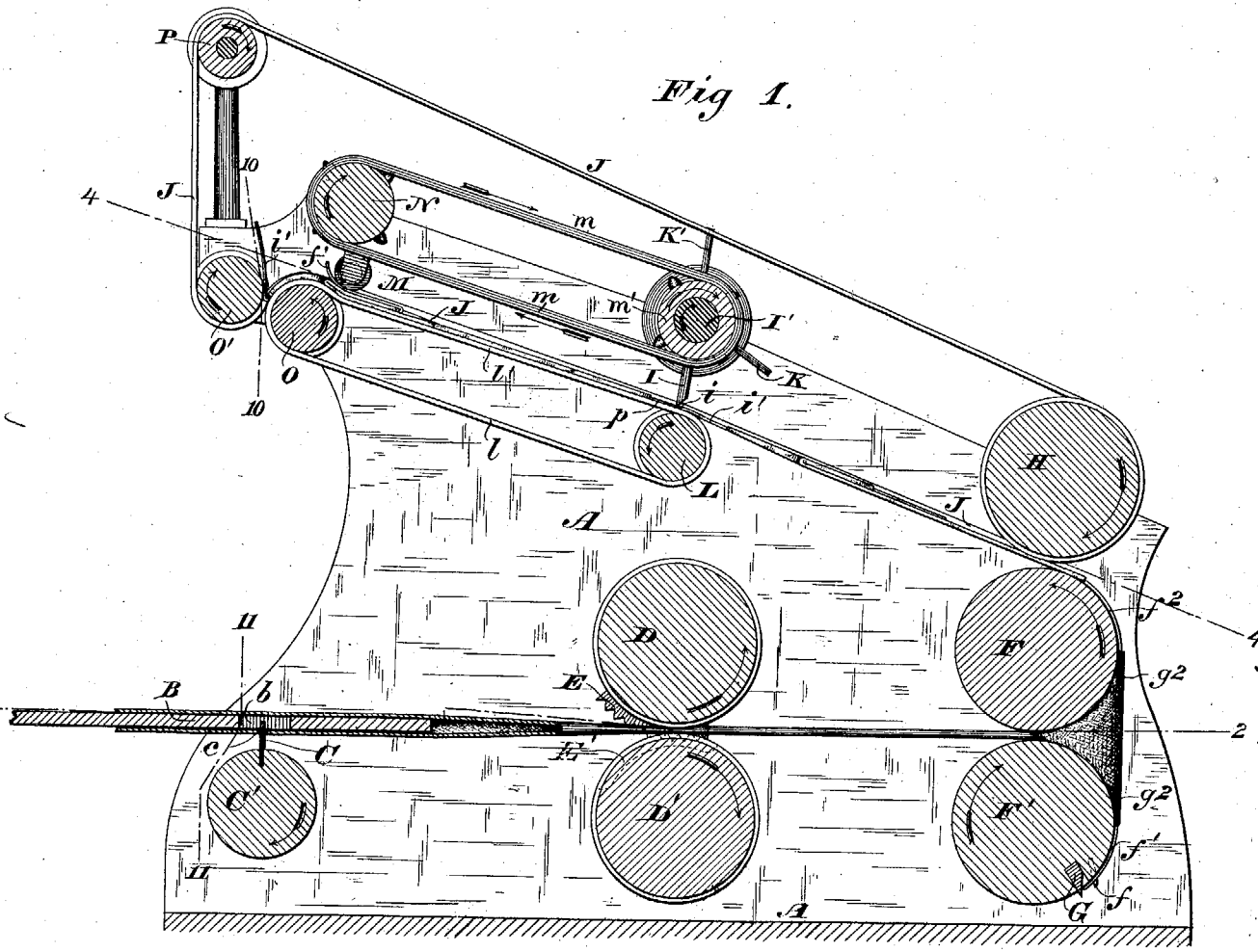

6 Sheets—Sheet 1.

C. B. STILWELL.

Assignor, by mesne assignments, to A. ADAMS & B. B. TAGGART.

Paper-Bag Machine.

No. 8,357. Reissued July 30, 1878.

WITNESSES

Geo W Breck

Wm A Skinkle

INVENTOR

Charles B Stilwell

By his Attorneys

Baldwin, Hopkins & Peyton

THE NORRIS PETERS CO., WASHINGTON, D. C.

C. B. STILWELL.
Assignor, by mesne assignments, to A. ADAMS, & B. B. TAGGART.
Paper-Bag Machine.
No. 8,357. Reissued July 30, 1878.
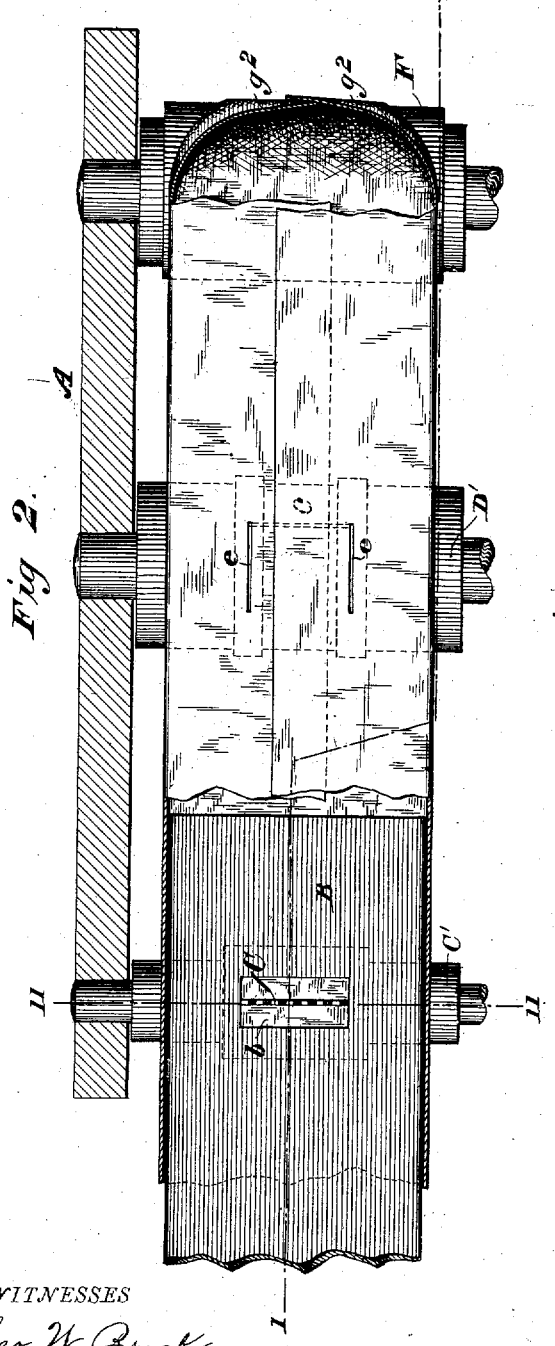
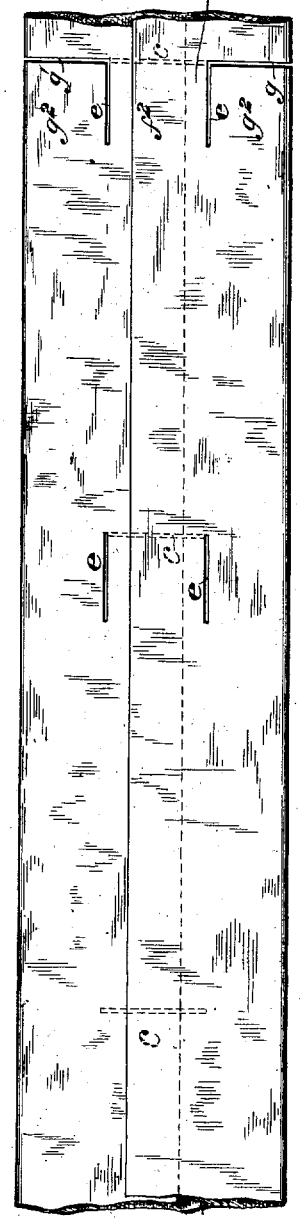
WITNESSES
Geo W. Breck,
Wm A Skinkle
INVENTOR
Charles B. Stilwell.
By his Attorneys
Baldwin Hopkins & Peyton
THE NORRIS PETERS CO., WASHINGTON, D. C.

6 Sheets—Sheet 3.
C. B. STILWELL.
Assignor, by mesne assignments, to A. ADAMS & B. B. TAGGART.
Paper-Bag Machine.
No. 8,357. Reissued July 30, 1878.
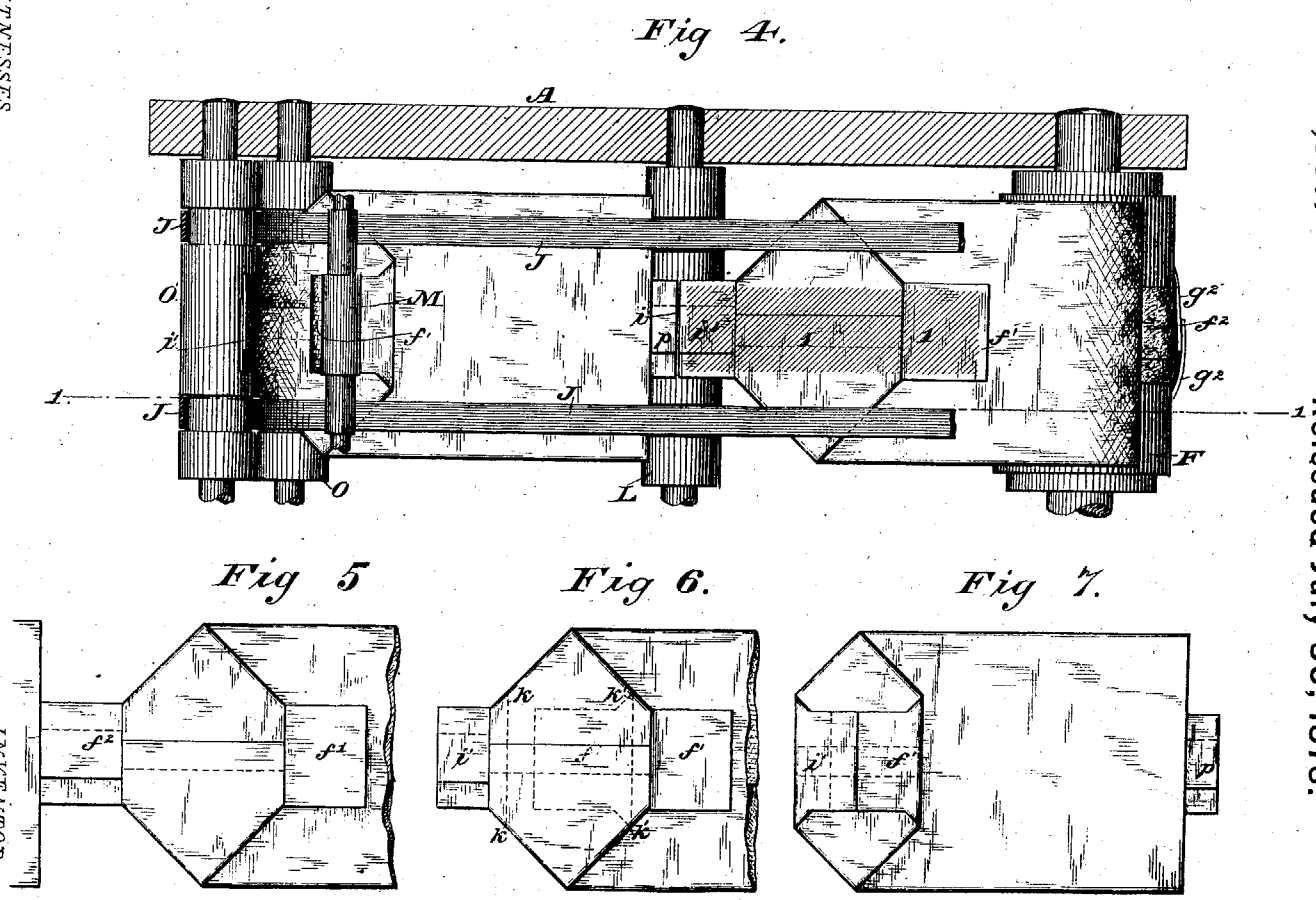
WITNESSES
Geo W Breck
Wm A Skinkle
INVENTOR
Charles B Stilwell
By his Attorneys
Baldwin Hopkins & Peyton
THE NORRIS PETERS CO., WASHINGTON, D. C.

C. B. STILWELL.

Assignor, by mesne assignments, to A. ADAMS & B. B. TAGGART.

Paper-Bag Machine.

No. 8,357. Reissued July 30, 1878.

WITNESSES

Geo W Breck.

Wm A Skinkle

INVENTOR

Charles B. Stilwell.

By his Attorneys

Baldwin Hopkins & Peyton

THE NORRIS PETERS CO., WASHINGTON, D. C.

C. B. STILWELL.

Assignor, by mesne assignments, to A. ADAMS & B. B. TAGGART.

Paper-Bag Machine.

No. 8,357. Reissued July 30, 1878.

WITNESSES

Geo W Breck.

Wm. A. Skinkle.

INVENTOR

Charles B. Stilwell.

By his Attorneys,

Baldwin Hopkins & Peyton

THE NORRIS PETERS CO., WASHINGTON, D. C.

C. B. STILWELL.
Assignor, by mesne assignments, to A. ADAMS & B. B. TAGGART.
Paper-Bag Machine.
No. 8,357. Reissued July 30, 1878.
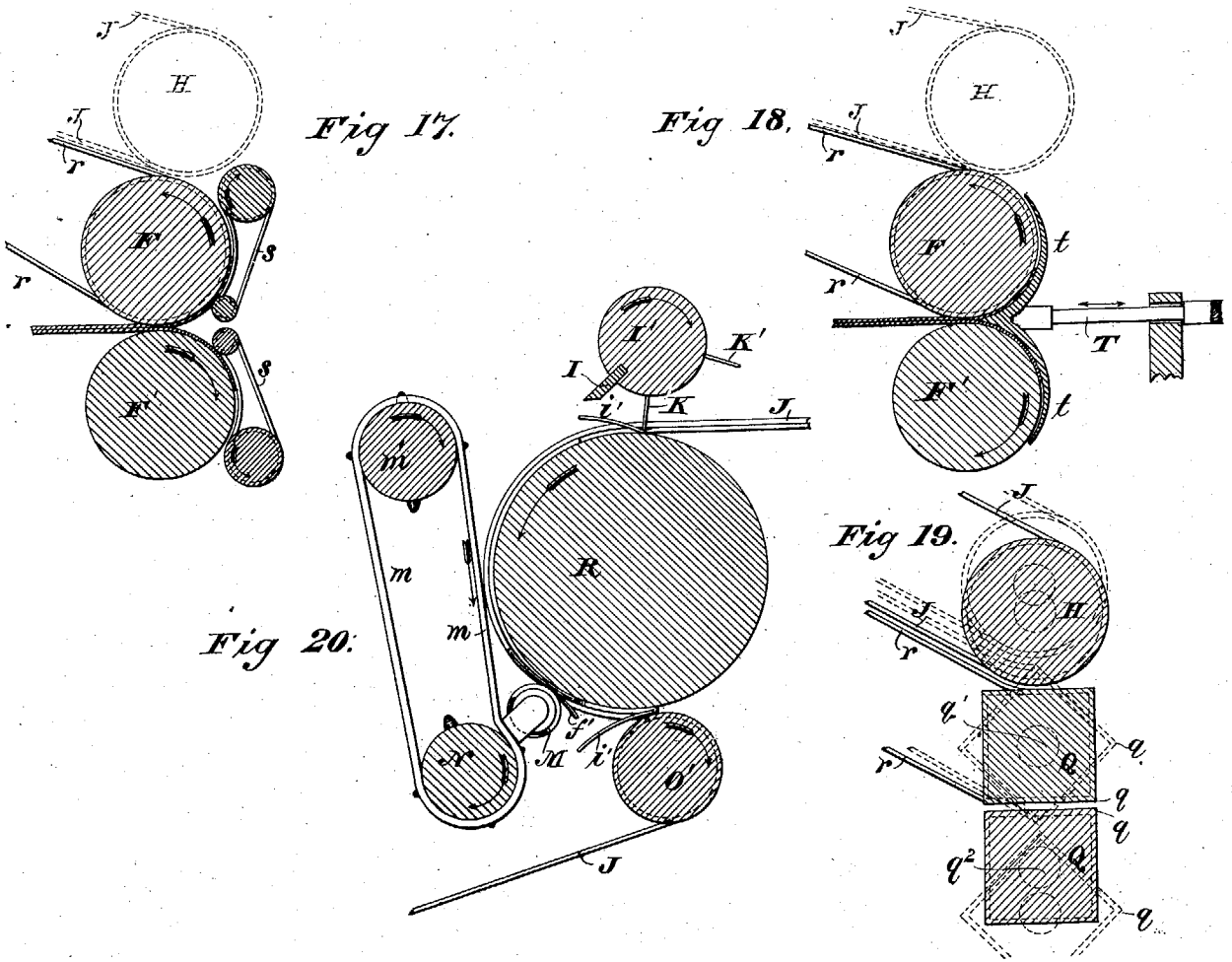
WITNESSES
Geo W Breck
Wm. A. Skinkle.
INVENTOR
Charles B. Stilwell.
By his Attorneys,
Baldwin Hopkins & Peyton
THE NORRIS PETERS CO., WASHINGTON, D. C.

UNITED STATES PATENT OFFICE.

CHARLES B. STILWELL, OF WORCESTER, MASSACHUSETTS, ASSIGNOR, BY MESNE ASSIGNMENTS, TO ALFRED ADAMS, OF CLEVELAND, OHIO, AND BYRON B. TAGGART, OF WATERTOWN, NEW YORK.

IMPROVEMENT IN PAPER-BAG MACHINES.

Specification forming part of Letters Patent No. 165,381, dated July 6, 1875; Reissue No. 8,357, dated July 30, 1878; application filed February 5, 1878.

*To all whom it may concern:*

Be it known that I, CHARLES B. STILWELL, of the city and county of Worcester, in the State of Massachusetts, have made an invention of certain new and useful Improvements in the Art of Manufacturing Satchel-Bottom Paper Bags, and in mechanism for making said bags, of which art and mechanism the following is a specification:

My invention contemplates the automatic formation of a satchel-bottomed paper bag from a tubular blank at one continuous operation by subjecting said blank successively to the operations of cutting, feeding, folding, and pasting mechanisms acting upon said blank in due order to complete the blank in the form required, and to discharge it from the machine. The preferred form of tubular blank is the common one having a longitudinal central seam on one side.

The first part of the invention, in the order of operation of the machine, relates to the cutting of the blank preliminary to forming its primary bottom fold. Its object is to preserve the integrity of the pasted seam, as, by doing this, the strength of the blank is preserved, and it is consequently better enabled to bear the strain of feeding without tearing; to which end my improvement consists in a novel method of making the first cut centrally and transversely on that side of the blank opposite that which contains the seam.

The next part of my invention relates to a novel method of partially severing the blank before the formation of the primary folds, its object being to do the preliminary cutting in such manner as to preserve the continuity of the pasted seam of the tubular blank, which end I attain by a novel method of partially severing a continuous tubular blank or series of unsevered blanks (having a central longitudinal seam) on each side of said seam, so that the seam remains unsevered until after the formation of the primary bottom fold.

The next part of my invention relates to cutting the blank in order to facilitate the formation of the primary folds; to which end my improvement consists in a novel method of subjecting a tubular blank in its passage through the machine, prior to the formation of the primary bottom fold, to the action of a series of cutters, the first of which perforates that side of the tube opposite the seam transversely and centrally to a width which partially determines the shape of the primary folds, the second of which cutters forms two parallel longitudinal slits through both sides of the tube, with their ends intersecting the cut first formed, and the third of which cutters makes two transverse cuts extending from one end of the cuts last formed to the edge of the blank in the line of the first transverse cut, thus leaving the blanks connected by a central strip of a width equal to the distance between the two parallel longitudinal slits, which strip aids in the formation of the primary fold and secures a continuous feed of a series of partially-severed blanks by the strain upon the paper itself.

My invention further consists in a novel method of determining the form of the bottom of the bag by the conjoint operation of a series of knives operating successively upon a tubular blank, and of two moving diverging surfaces, between which the blank is continuously fed, and to which surfaces the contiguous sides of the blank are automatically caused temporarily to conform as they move over said surfaces.

The next part of my invention also relates to the method of feeding the blank through the machine. Its object is to enable me to utilize the strain upon the blank itself as an element in the process of the formation of the bottom folds of the blank; to which end my improvement consists in a novel method of feeding the tubular blanks through the machine in a continuous strip or series of unsevered blanks until after the opening fold is made.

My improvement under this head further consists in a novel method of feeding a continuous tubular blank or series of unsevered blanks through the machine in a continuous strip or web until the primary bottom fold is formed and paste applied thereto, whereby the strain upon the paper itself is utilized in the formation of the primary folds.

The next part of my invention relates to a novel method of feeding the tubular blanks through the machine. Its object is to prevent the opening of a freshly-pasted seam while the bottom is being formed; and to this end my improvement consists in feeding a tubular blank or series of connected blanks continuously through the machine with the seam next to the working surfaces or cylinders upon which the primary folds are formed by the strain upon the paper itself.

The next part of my invention relates to a novel method of forming the primary bottom fold of the bag. It is based upon and consists in the discovery that a tube can be opened, and the primary bottom fold of the bag can be formed by simply passing such a tube between two adjacent diverging moving surfaces, to each of which surfaces the side of the paper-tube contiguous thereto is caused temporarily to adhere until the primary bottom fold is formed by the strain upon the paper itself.

The next part of my invention relates to the method of opening the mouth of a tubular blank to form the primary folds, which end I attain by a novel method of feeding tubular blanks between adjacent diverging moving surfaces, one of which surfaces is provided with pins, which penetrate the tube before or during its passage between the diverging surfaces, retain their hold upon one side thereof until the primary folds are formed, and then release it by the continued diverging movements of the surfaces and the strain upon the paper itself, or by the withdrawal of the pins, as the case may be.

My improvement under this head further consists in a novel method of feeding a continuous tubular blank or partially-severed blank, or a series of partially-severed blanks, between adjacent diverging moving surfaces, with means for holding one side of the tubular blank upon one of the diverging surfaces, to open the mouth of the blank while the blank itself, or the series of blanks, is caused to adhere to the other diverging surfaces by the strain upon the paper itself until the positively-held side of the tubular blank is released after the formation of the primary fold, and the blank is then drawn between surfaces which press or flatten out the said fold by the strain upon the paper itself.

My improvement further consists in a novel method of forming the first of the final folds of a blank by the conjoint operation of bands which hold the edges of the blank outside of the portions to be folded while passing continuously through the machine, and a following folder which travels continuously faster than the blank on an independent carrier and in the same direction therewith.

The next branch of my invention is based upon the discovery that the finishing bottom fold may be made by passing the partially folded blank between two moving converging surfaces, said blank being held between guiding strips or bands, which prevent the edges of the blank from being raised while the fold is being made; and my improvement consists in a novel method of forming the finishing fold of the blank by the conjoint operation of bands which hold the edges of the blank outside of the portions to be folded while passing continuously through the machine, and finishing-rolls or compressing-surfaces, between which the blank is guided by the bands at an angle to the line of motion of the blank, and compressed while being held by said band.

Finally, my improvement consists in a novel art of automatically making satchel-bottomed paper bags by subjecting a tubular blank continuously and successively to the operations of partially cutting, opening, pasting, severing, folding, and compressing, whereby the bags are formed while passing continuously through the machine.

My improvements enable me to manufacture satchel-bottom paper bags by automatic machinery embodying the discoveries hereinbefore recited; and my improved mechanism, thus organized, performs the following successive operations upon a continuous tubular blank: first, partially or wholly severing the blank according to the style of the bottom to be given to the bag; secondly, opening the end of the blank and forming the first fold; thirdly, applying paste to the blank; fourthly, severing the blank in certain cases; and fifthly, folding the bottom flaps to complete the bag.

The accompanying drawings represent so much of a paper-bag-forming machine embracing my improvements as is necessary to illustrate the subject-matter herein claimed in the best way now known to me of carrying out the objects of my invention. Obviously, however, some of the improvements therein shown and herein described may be used without the others and in machines differing somewhat in construction and operation from the one herein shown.

The details of construction of the devices herein shown may also obviously be varied in different well-known ways by the mere skill of the workman without departing from the spirit of my invention.

Figure 9:
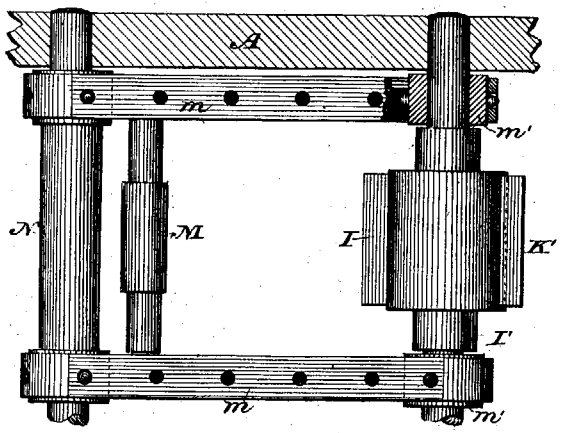
Figure 10:
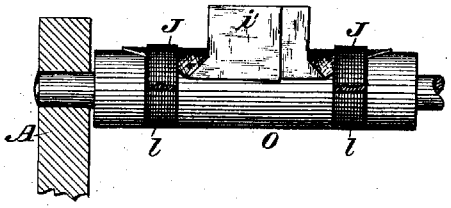
Figure 11:
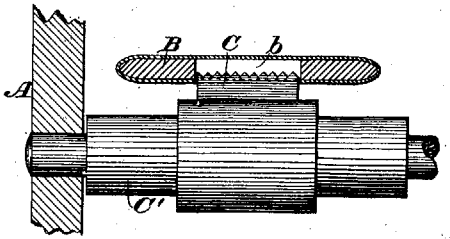
Figure 8:
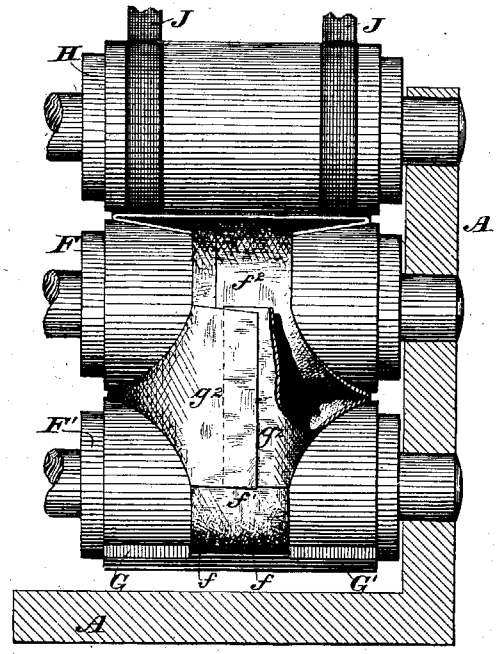
Figure 13:
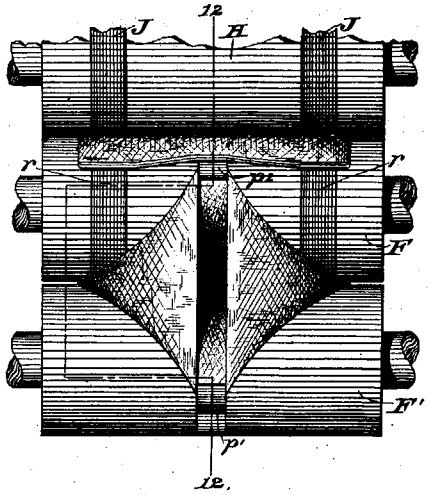
Figure 12:
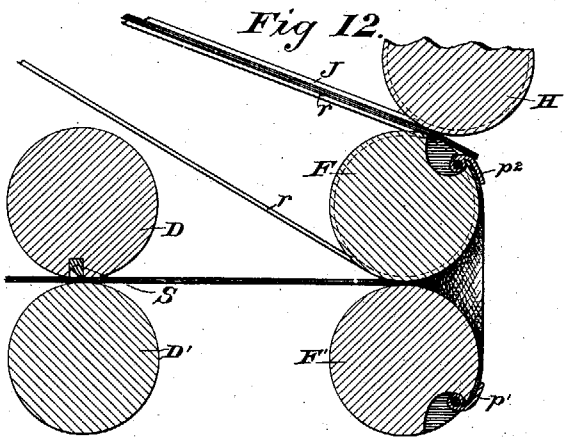
Figure 16:
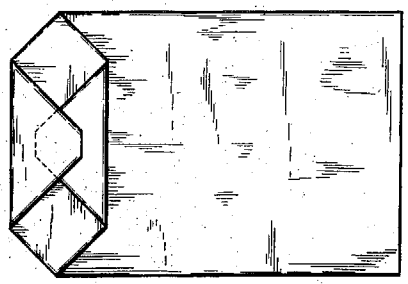
Figure 15:
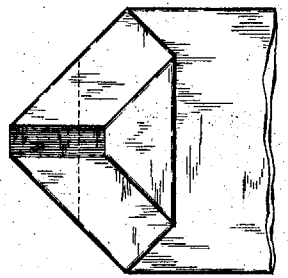
Figure 14:
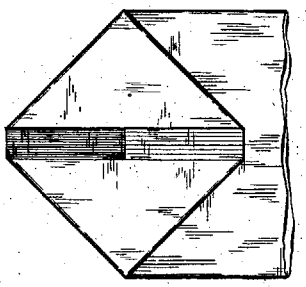

Figure 1 represents a vertical longitudinal section through my improved machine on the line 1 1 of Figs. 2 and 4, showing the tubular blanks as passing therethrough. Fig. 2 represents a horizontal section through the machine on the line 2 2 of Fig. 1, looking down upon the tubular blank and lower rolls, the blank being shown as partially torn away to show the intruding end of a tubing-machine former of well-known construction. Fig. 3 represents a plan or top view of a tubular blank, showing the different and successive cuts made therein while passing successively over the rolls shown in Fig. 2, which cuts are especially adapted for the formation of the bag shown as complete in Fig. 7. Fig. 4 represents a horizontal transverse section through the machine on the line 4 4 of Fig. 1, showing the final stages of completion of the tubular blank. Fig. 5 shows the tubular blank as it appears after the completion of its primary fold. Fig. 6 represents a similar view of the blank after it is severed from the preceding one, the position assumed by the first flap after being folded to make the second fold of the bottom being indicated by dotted lines. Fig. 7 is a view of the finished bag illustrated in various stages of completion of the two preceding figures. Fig. 8 represents a view, partly in section and partly in elevation, of a portion of one end of the machine, showing the attitude assumed by the tubular blank at the moment of the formation of the primary folds of the bottom of the bag, a portion of the blank being torn away, more clearly to show the formation of the fold. Fig. 9 represents a plan view, partly in section, showing a portion of the creasing and final-folding mechanism detached. Fig. 10 represents a vertical transverse section through one end of the machine on the line 10 10 of Fig. 1, showing the attitude assumed by the end of the tube during the completion of its last fold. Fig. 11 represents a similar section on the line 11 11 of Figs. 1 and 2, showing the relation between the tubing-machine former and the preliminary cutter which severs the side of the blank opposite the seam. Fig. 12 represents a vertical longitudinal section through the machine on the line 12 12 of Fig. 13, showing a modification of my invention, whereby it is adapted to the formation of a bag such as shown as completed in Fig. 16. Fig. 13 represents an end or face view of the mechanism shown in Fig. 12. Figs. 14, 15, and 16 represent, in its various stages of completion, an ordinary satchel-bottom bag, the primary fold of which is formed by the mechanism shown in Figs. 12 and 13. Fig. 17 represents a vertical transverse section through another modification of my invention, in which the primary fold of the tubular blank is formed by the aid of the traversing endless belts in place of the nippers shown in Figs. 12 and 13. Fig. 18 represents a similar view of another modification, in which the tubular blank is opened and the first fold formed by the aid of a reciprocating spear. Fig. 19 represents another modification, showing mechanism whereby the primary fold may be formed by the action of diverging surfaces not curved; and Fig. 20 shows a modification of the creasing and final-folding mechanism.

In this instance the mechanism is shown as mounted in a suitable frame, A, one side only of which is shown in the drawings. The end of a former, B, which may constitute a portion of an ordinary tubing or seaming machine, (upon which the paper tube from which the bags are to be made is formed,) is shown as intruding within one end of the frame, and with a transverse central slot or opening, *b*, in which a revolving serrated knife, C, works, to make a transverse cut, *c*, in the lower side of the tube, as shown at *c*, Figs. 2 and 3.

The tubular blank, it will be observed, is formed with a central longitudinal seam, and is fed into the machine with the seam uppermost, so that when the cut is made in the lower side of the tube it extends across but underneath the seam.

The knife C, in this instance, is shown as mounted in a shaft, C′, and revolves, in the direction shown by the arrows thereon, at a rate of speed corresponding to that at which the tube moves along the former, and makes a cut at every revolution of the knife-shaft, the distance between these cuts being equal to the length of a blank, as shown by dotted lines *c*, Fig. 3.

Rolls D D′, revolving in the direction indicated by the arrows, moving at a speed corresponding to that at which the tubular blank travels, constitute, in this instance, feeding-rolls, to give the desired motion to the paper tube. These rolls are respectively provided with knives E and corresponding recesses E′, in which the knives work. These knives make two parallel slits, *e e*, through both sides of the flattened tubular blank and on opposite sides of the seam, as shown in Figs. 2 and 3. The forward ends of these slits, relative to the direction in which the blank travels, terminate at the opposite ends of the cut *c* in the bottom or under side of the blank. The tubular blank, with the cut *c* and slits *e e* thus formed therein, next passes between two moving surfaces, which, in this instance, are formed of cylinders or rolls F F′, revolving in the direction shown by the arrows, the latter of which rolls is provided with knives G G′, Fig. 8, which make transverse cuts $g\ g^1$, and from the outer edges of the tube to and joining the slits *e e*, thus completely severing the under side of the tubular blank, forming a flap, $f^1$, and leaving the upper portion unsevered only between the slits *e e*. (See Figs. 5 and 8.) The flap thus formed, it will be observed, embraces the seam. The rolls F F′, in this instance, revolve at the same rate of speed as that at which the tubular blank travels, and in the directions indicated by the arrows thereon.

The knives in the roll F′ are so arranged relatively to those heretofore described as to operate at the proper time to make the cuts $g\ g^1$ at the desired points. The unsevered portion or flap $f^2$ of the upper side of the tubular blank remains connected with the preceding blank, passes up and over the roll F, and furnishes the means of keeping up the continuity of the feed, as well as determining the direction of the traverse of the blank. The lower flap, $f^1$, of the tubular blank is caught by perforating-pins *f* on the lower roll, F′, which cause that side of the blank to conform to the contour of the surface of the roll during a certain period of its revolution.

The upper portion of the blank being simultaneously conformed to the contour of the surface of the upper roll, F, it results that the end of the tubular blank is opened by the diverging of the two surfaces, and the strain upon the paper causes the sections $g^2$ $g^2$ gradually to flatten and draw inward from the edges of the tubular blank, and fold over inwardly upon the inner surfaces of the opened portion of the tubular blank, as clearly shown in Fig. 8. The slits *e* *e* are, by preference, made of such length as to cause the edges of the blank to overlap on a central longitudinal line, to facilitate the operation of pasting, as hereinafter explained.

The flap $f^1$ is released from the holding-pins *f* on the lower roll at the proper moment after the formation of the fold simply by being torn away by the strain on the paper.

The needles or pin-points, instead of being fixed in the roll and releasing the paper by tearing through the flap, may sometimes be made movable and caused automatically to retract and release the flap, to prevent the blank from being torn by the strain at the slits or cuts—as, for instance, when strong heavy paper is used, such as employed in the manufacture of flour-sacks.

The lower flap, $f^1$, being released, the continued movement of the blank carries the folded portion upward, to be acted upon by a compressor, composed, in this instance, of a roll, H, between which and the roll F the tube passes, and the first fold is pressed flat upon the tube. (See Figs. 4 and 5.)

It is obvious that this method of opening the tube and forming the first fold may be accomplished in numerous ways. Some modifications of the devices just described will hereinafter be specified.

Paste is applied to or printed upon portions of the blank indicated by the shading 1, Fig. 4, in this instance by the roll H. The paste may be supplied to the proper portion of the roll in any of the usual ways. In this instance that portion of the roll which applies the paste is indented or engraved for a well-known purpose. After the paste is applied to the blank it passes to a severing-knife, I, preferably fixed in a revolving head, I′, the movement of which is so timed relatively to the speed at which the blank travels as to cause it to operate at the proper time to sever the connecting-strip $f^2$ at *i*, as shown in Fig. 4, leaving the blank in the condition shown by Fig. 6—separated from the preceding blank, and forming a second flap, *i′*. This cut *i* also forms a lip, *p*, on the unfolded end of the preceding blank. In the movement of the blank from the roll H to the severing-knife I, bands J J, between the roll H and the blank, serve both to guide the blank and prevent any accidental adhesion of the pasted surface of the blank to the pasting-roll. In this instance I have shown the bands J J as endless and composed of flexible material, traveling with the roll H and with the blank. Creasing-blades K K′, in this instance fixed in the same head as that in which the severing-knife I is secured, are so arranged relatively to the knife, the blank, and the preceding mechanism as respectively to indent or crease the folded end of the blank on the dotted lines indicated at *k* *k′*, Fig. 6, while the blank passes between the head I′ and a roll, L. The surface of the roll L is provided with a rigid cutting-surface, against which the severing-knife I operates, and with elastic surfaces, against which the creasing-blades act to accomplish the last-named operation of creasing.

It is obvious that the severing-knife and creasers may be arranged on separate supports to operate independently and in different order from that above indicated. After the blank has been creased it passes between the bands J J and bands or tapes *l* *l* (which, in this instance, like the bands J J, are endless, and serve as carrying-tapes) to finishing or final-folding or compressing surfaces, composed in this instance of rolls. During this passage to the finishing compressing surfaces or rolls the flap $f^1$, which has been slightly raised from the blank by the operation of the creaser-blade K′, is folded down at the line *k′* upon the folded and pasted portion of the blank, as shown in dotted lines in Fig. 6, by a following folder, M, moving, while operating upon the flap, in the same direction as but faster than the blank. In this instance the requisite movement is given to the folder M by mounting it on and between two endless carrying-belts, *m* *m*, which pass around a shaft, N, and around loose pulleys *m′* *m′* on the shaft of the head I′, as shown in Figs. 1 and 9, the shaft N being geared to carry the belts at a speed greater than that at which the blank travels, and so as to make a complete circuit of the folder at proper and regular intervals to engage the raised flap $f^1$ of each blank in succession, and fold it down, as shown, and at the same time to operate relatively to the head I′ so as not to interfere in its passage with the severing-knife or creasing-blades. To prevent slipping of the belts *m* *m* and insure accuracy in the movement of the follower-folder, I prefer to use perforated belts or chains and sprocket-teeth.

After the flap $f^1$ has been folded down the remaining flap *i′* is folded in place, as shown in Fig. 7, by passing the blank between finishing surfaces or rolls O O′, so arranged relatively to the line of motion of the blank as to allow the end of the flap in advance to be carried past the dividing-line or the rolls and ride up on the farther roll, O′, while its rear portion is drawn down with the body of the blank by the bands between the rolls at an angle with the said line of motion. By this arrangement I dispense with an auxiliary folder, and need not use even a creaser to determine the line of the fold. The blank is presented to and passes between the finishing folding-rolls while held in place and guided by the bands J J and *l* *l*. The bands J J, it will be observed, rest upon the upper side of the blank, near its edges, out of the way of the severing-knife, creasers, and folders, but sufficiently near the flaps to effectually prevent that portion of the bottom not to be folded from being raised by the action of the following folder and finishing folding-rolls, and pass over the roll O and under the roll O′, in such manner as to release the finished bag from between these bands J J and the bands *l l*, when it leaves and is discharged from the machine by the finishing folding-rolls a completed bag. In this instance I have shown the bands J J as passing around tightening-pulleys P and around the roll H, and as traveling with the blank.

The essential objects sought to be attained in the employment of these bands being to prevent the adhesion of the blank to the roll H, to hold in position those portions of the blank not to be folded during the operation of the following-folder and finishing folding-rolls, and while thus holding the blank to guide it between the finishing folding-rolls, it is obvious that these functions would be performed by rigid bands properly secured in position. It is also obvious that rigid bands, or a plate properly secured in position, might be employed in place of the bands *l l*, between which and the bands J J the blank passes; also, that the bands J J, flexible or rigid, might be made in separate sections, one section extending from the roll H to the roll L and the other from the roll L to the finishing-rolls, in which case the bands from the roll L to the finishing folding-rolls should preferably be arranged inside of the section passing from the roll H to the roll L.

From the foregoing description of my improvements, the operation of which will be readily understood, it will be seen that I am enabled to produce satchel-bottomed bags from a tube of paper by passing it in its flattened condition continuously through the machine, during which passage it is cut into blanks, which are opened at one end, folded, and pasted by the connected operations of the mechanism, which mechanism is simple in construction and positive and rapid in operation, thus reducing the cost of producing such bags to the minimum.

The bag, it will be seen, has a strong double bottom, and is so lapped in folding, previous to the application of the paste, that all danger of accidental spreading of the paste to the inside of the bag is entirely obviated, and at the same time the pasted surface is so ample as to insure a tight bottom, even though the paste by accident should not cover the whole of the surface intended to be pasted.

It will also be seen that the manner in which the tube is cut previous to the first folding thereof facilitates the opening of the blank, and after the first fold is made admits of the severing of the connecting-strip in such manner as to make the flap of the proper length to reach to or near the middle of the bottom, instead of lapping beyond, thus facilitating the making of the extra fold or doubling together of the bottom on a central line extending from edge to edge of the flattened bag, which fold it is desirable to make when the bag is to be printed, and at the same time leaving a portion of the connecting-strip on the top end of the bag, to form a lip or projection to facilitate the opening of the bag for filling, which lip may be gummed to make a self-sealing top, doing away with the necessity of using strings to fasten the bag.

I have described the construction of mechanism which I have found by practice to be preferable. It is obvious, however, that this mechanism may be modified in various ways without departing from the spirit of my invention, some of which modifications, as also practiced by me, I will now proceed to describe.

Instead of employing the needles or points *f*, heretofore described, for opening the blank, suitable glutinous or adhesive substance may be applied to cause the paper to stick to the roll F′ at the points occupied by the pins until released therefrom by the strain on the paper; and to insure the retention of the paper on the surface of the roll F′ after the tube is opened for the proper time, one or more movable nippers, $p^1$ $p^2$, Figs. 12 and 13, operating automatically, similar to those ordinarily used in cylinder printing-presses for carrying the sheet, may be employed. These nippers are timed to release the flap at the proper moment.

Instead of moving cylindrical surfaces, before described as composed of rolls F F′, for opening the blank and making the first fold, blocks or polygonal shafts Q, Fig. 19, may be employed upon the diverging surfaces *q* of which the blank is operated upon to accomplish the results before described. The journals $q^1$ $q^2$, upon which these blanks revolve, are mounted in sliding boxes, and so geared as automatically to move away from and toward each other, to compensate for the irregular or constantly-varying distances between the adjacent surfaces of the blocks and the centers upon which they respectively revolve.

Instead of the rolls L and O and the bands *l l* for carrying and holding the paper during the creasing and folding, as before described, a single cylinder, R, Fig. 20, may be used in connection with the severing-knife I, the creaser, the following folder M, and final-folding roll O′.

The ordinary satchel-bottomed bags (shown in Figs. 14, 15, and 16) may be made upon my machine without involving any changes in the construction or operation of the mechanism other than those which I will now mention.

In place of all the knives I use simply one straight knife, S, for completely severing the blanks from the tube, which I prefer to mount in one of the rolls D D′, as shown in Fig. 12; and for opening the blank I supply the roll F (or the upper one of the blocks Q) with the same mechanism heretofore described, in connection with the roll F′, (or the lower block Q,) as it is necessary, where there is no connecting-strip between the blanks, to take hold of the upper side of the blank, as well as the lower, to open it, and to thus carry it under the roll H, which operates upon the fold, as before described, and feeds the blank along.

In the modification shown in Figs. 12 and 13 the nippers $p^1$ and $p^2$ determine the width of the bottom fold, as will be seen, and the nipper $p^2$ is released in the same manner as the nipper $p^1$ after passing beneath the roll H. The bands *l l* are continued, as shown at *r r*, and pass around the roll F, (see Figs. 12 and 13,) to aid in carrying the severed blanks.

In Fig. 17, instead of the nippers, endless belts *s s* are shown as employed, and, like the nippers, are made of the requisite width to determine the fold. The tube is opened and presented to the belts by means such as employed in connection with the nippers. To secure the proper direction of movement of the blank, if it has previously been completely severed from the preceding one, the upper belt is made to press more tightly against the roll F than the lower one presses against the roll F′, so that its hold upon the paper is sufficient to draw the lower side of the blank from between its roll and belt after the fold is made. The belts may be employed with either connected or separated blanks.

In Fig. 18 a spear-pointed separator, T, with projecting arms *t t*, curved to conform to the shape of the rolls, enters between the two sides of the blank, opens it, and guides the sides along their respective rolls, the separator being of the proper width to determine the fold, and being drawn away automatically from the rolls at the proper time to release the lower side of the blank and to be again presented to the next blank.

In practice I have sometimes dispensed with the intermediate knife-rolls D D′ and placed the slitting-knives upon either or both of the opening-rolls F F′; but I prefer the form shown, as I find the paper to have a tendency to catch on the knives when used on the opening-rolls and interfere with their proper action.

By the foregoing improvements, I am enabled to form the primary fold in the blank while passing continuously through the machine simply by the strain upon the paper itself, and to dispense with an independent creasing-clamp, such as has heretofore been employed to clamp the blank positively down upon a folding-surface, over which surface a portion of the blank must be folded to form the central bottom crease.

It will be observed that the seamed side of the tubular blank is contiguous to the opening-surface, over which the entire blank travels in its passage through the machine, and thus is entirely prevented from being torn apart or separated during the opening and pressing operation. Thus I am enabled to use a tube fresh from the seamer without any drying process, the advantages of which will be readily seen.

I claim as my own invention—

1. As an improvement in the art of forming satchel-bottomed paper bags by machinery, the method hereinbefore set forth of making a preliminary central transverse cut through the side of the tubular blank opposite that which contains the seam, whereby the integrity of the seam is preserved, for the purposes specified.

2. As an improvement in the art of forming satchel-bottomed paper bags by machinery, the method hereinbefore set forth of partially severing a continuous blank, or series of unsevered blanks, by making longitudinal cuts through both plies on each side of the central longitudinal seam of the blank, whereby the seam remains unsevered until after the formation of the primary bottom fold.

3. As an improvement in the art of forming satchel-bottomed paper bags by machinery, the method hereinbefore set forth of subjecting a tubular blank in its passage through the machine, prior to the formation of its primary bottom fold, to the action of a series of cutters, the first of which perforates the side of the tube opposite the seam transversely and centrally to a width which partially determines the shape of the primary folds, the second of which cutters forms two parallel longitudinal slits through both sides or plies of the tube, with their ends intersecting the cut first formed, the third of which cutters makes two transverse cuts extending from one end of the slits last formed to the edge of the blank in the line of the first transverse cut, thus leaving the blank connected to the web by a central slip of width equal to the distance between the two parallel longitudinal slits, whereby the strip aids in the formation of the primary fold and secures a continuous feed of a series of partially-severed blanks by the strain upon the paper itself.

4. As an improvement in the art of forming satchel-bottomed paper bags by machinery, the method hereinbefore set forth of determining the form of bottom of the bag by the conjoint operation of a series of knives operating successively upon the tubular blank, and of two moving diverging surfaces, between which the blank is continuously fed, and to which surfaces the contiguous sides of the blank are automatically caused temporarily to conform, as they move over said surfaces, by means substantially such as hereinbefore set forth.

5. As an improvement in the art of forming satchel-bottomed paper bags by machinery, the method hereinbefore set forth of feeding a tubular blank through the machine in a continuous strip or series of unsevered blanks, whereby the blank being folded is connected with the one in advance of it until after the opening fold is made.

6. As an improvement in the art of forming satchel-bottomed paper bags by machinery, the method hereinbefore set forth of feeding a continuous tubular blank or series of unsevered tubular blanks through the machine in a continuous strip or web, forming the bottom fold thereon, and applying paste to such fold so formed prior to severing its connecting-strip, whereby the strain upon the paper is utilized in the formation and pasting of the primary fold.

7. As an improvement in the art of forming satchel-bottomed paper bags by machinery, the method hereinbefore set forth of feeding a tubular blank or series of connected blanks continuously through the machine, with the central seam next the working surfaces or cylinders upon which the primary folds are formed by the strain upon the paper itself.

8. As an improvement in the art of forming satchel-bottomed paper bags by machinery, the method hereinbefore set forth of opening the end of a tubular blank and forming the first fold thereof by means of the conjoint action of two adjacent diverging moving surfaces, substantially such as described, between which the blank is continuously fed, and to which surfaces the contiguous sides of the blank are caused temporarily to conform as they move over said surfaces by means substantially such as described, whereby the fold is formed while the blank is in motion simply by the strain upon the paper itself.

9. As an improvement in the art of forming satchel-bottomed paper bags by machinery, the method hereinbefore set forth of continuously feeding a tubular blank between adjacent diverging moving surfaces, one of which surfaces is provided with pins which penetrate the tube before or during its passage between the diverging surfaces, retain their hold upon one side thereof until the primary folds are formed, and then release it by the continued diverging movement of the surfaces and the strain upon the paper itself, or by the withdrawal of the pins, as the case may be.

10. As an improvement in the art of forming satchel-bottomed paper bags by machinery, the method hereinbefore set forth of pressing down the first fold of the tubular blank by means of the conjoint operation of two adjacent diverging surfaces, between which the blank is continuously fed, to which surfaces the contiguous sides of the blank are caused temporarily to conform as they move over said surfaces by means substantially such as described, and upon which surfaces the fold is formed, while the blank is in motion, by the strain upon the paper itself, and a compressor, substantially such as described, whereby the fold is pressed flat upon the blank immediately after being formed.

11. As an improvement in the art of forming satchel-bottomed paper bags by machinery, the method hereinbefore set forth of forming the first of the final folds of the blank by means of the conjoint operation of bands, substantially such as described, which hold the edges of the blank outside of the portions to be folded while passing continuously through the machine, and a following-folder, substantially such as described, which travels continuously faster than the blank on an independent carrier, and in the same direction therewith, while forming the fold.

12. As an improvement in the art of forming satchel-bottomed paper bags by machinery, the method hereinbefore set forth of forming the finishing fold of the blank by means of the conjoint operation of bands, substantially such as described, which hold the edges of the blank outside of the portions to be folded while passing continuously through the machine, and finishing-rolls or compressing-surfaces, substantially such as described, between which the blank is guided by the bands at an angle with the line of motion of the blank, and compressed while being held thereby.

13. The hereinbefore-described novel art of forming satchel-bottomed paper bags by automatic machinery, which consists in subjecting a tubular blank continuously and successively to the operations of mechanism substantially such as hereinbefore set forth, which partially cuts the blank, opens, pastes, cuts, folds, and compresses it, whereby the bags are completely formed from a tubular blank while passing continuously through the machine.

CHAS. B. STILWELL.

Witnesses:
GEORGE HOLT,
J. HENRY HILL.